US006547669B1

(12) United States Patent
Neviani

(10) Patent No.: US 6,547,669 B1
(45) Date of Patent: Apr. 15, 2003

(54) BELLOWS AND CORRESPONDING ROTARY JOINT

(75) Inventor: Claude Neviani, Mezy sur Seine (FR)

(73) Assignee: GKN Automotive AG, Lohmar (DE)

( * ) Notice: Subject to any disclaimer, the term of this patent is extended or adjusted under 35 U.S.C. 154(b) by 0 days.

(21) Appl. No.: 09/787,329

(22) PCT Filed: Jul. 11, 2000

(86) PCT No.: PCT/FR00/02005
§ 371 (c)(1),
(2), (4) Date: Mar. 16, 2001

(87) PCT Pub. No.: WO01/06143
PCT Pub. Date: Jan. 25, 2001

(30) Foreign Application Priority Data

Jul. 19, 1999 (FR) .............................. 99 09349

(51) Int. Cl.$^7$ .................................. F16D 3/84
(52) U.S. Cl. .......................... 464/175; 277/636
(58) Field of Search ................ 464/175, 173, 464/111, 905; 277/636, 635, 637, 924

(56) References Cited

U.S. PATENT DOCUMENTS

| 4,132,422 A | * | 1/1979 | Sankey et al. | 277/212 FB |
|---|---|---|---|---|
| 4,558,869 A | * | 12/1985 | Grove et al. | 464/175 |
| 4,673,188 A | * | 6/1987 | Matsuno et al. | 277/212 FB |
| 4,852,891 A | * | 8/1989 | Sugiura et al. | 277/212 FB |
| 4,936,811 A | * | 6/1990 | Baker | 464/175 |
| 5,094,894 A | * | 3/1992 | Schafferus et al. | 464/175 |
| 5,529,538 A | * | 6/1996 | Schulz et al. | 464/111 |
| 5,672,113 A | * | 9/1997 | Tomogami et al. | 464/175 |
| 6,089,574 A | * | 7/2000 | Sadr et al. | 277/636 |
| 6,179,717 B1 | * | 1/2001 | Schwarzler | 464/175 |
| 6,190,260 B1 | * | 2/2001 | Flores et al. | 464/111 |
| 6,227,748 B1 | * | 5/2001 | Hayward et al. | 464/175 |
| 6,251,019 B1 | * | 6/2001 | Hofmann et al. | 464/111 |
| 6,471,595 B1 | * | 10/2002 | Neviani | 464/175 |

FOREIGN PATENT DOCUMENTS

| DE | 1 032 679 | 10/1953 |
|---|---|---|
| DE | 86 32 511.6 | 4/1987 |
| FR | 2 754 024 A1 | 4/1998 |
| GB | 2 281 301 A | 3/1995 |
| JP | 05 180350 | 7/1993 |
| JP | 06 185534 | 7/1994 |
| JP | 09 014284 | 1/1997 |
| JP | 10 267125 | 10/1998 |

* cited by examiner

Primary Examiner—Lynne H. Browne
Assistant Examiner—Kenneth Thompson

(57) ABSTRACT

The invention concerns a bellows (7) designed to be coupled by a front end region (30) to a first rotary member (8) and by a rear end region (34) to a second rotary member (6). The bellows rear end region (34) is provided, over at least part of its periphery whereof the axial curve has a transverse contour with inflection points, a radially projecting lug (36) designed to be housed in a groove (20) of the second rotary member to retain axially the bellows rear end region (34) relative to the second rotary member (6), and sealing means designed to be supported on the second rotary member. The sealing means are axially located on the same side as at least part of the lug (36) retaining the bellows rear end region (34). The invention is applicable to tripod constant velocity universal joints.

15 Claims, 4 Drawing Sheets

BELLOWS AND CORRESPONDING ROTARY JOINT

BACKGROUND OF THE INVENTION

The present invention relates to an elastic boot of the type intended to be connected by a front end region to a first rotary member and by a rear end region to a second rotary member, the rear end region of the boot being equipped, on the one hand, around at least part of its periphery, the directrix curve of which has a transverse outline exhibiting points of inflection, with a radially projecting enlargement intended to be housed in a groove of the second rotary member so as to hold the rear end region of the boot axially in place with respect to the second rotary member and, on the other hand, with sealing means intended to bear on the second rotary member.

The invention applies in particular to constant-velocity tripot transmission joints.

Such joints allow rotary movement to be transmitted between a first shaft bearing a male element or tripod and a female element or bell housing which rotates as one with, for example, the output side gear of a differential.

The tripod has three arms each bearing a rolling assembly. Each rolling assembly is intended to roll along a pair of tracks formed in the bell housing. The tripod and the tulip have ternary symmetry.

A boot as defined above is therefore connected by its front end region to a first shaft and its rear end region is slipped onto a front end region of the bell housing so as to protect the joint against external agents and hold a lubricant therein.

In general, the bell housing is made partly by forging and in cross section has three lobes which are convex and farther from the longitudinal axis of the bell housing, and three concave parts closer to its longitudinal axis. The terms "concave" and "convex" are to be understood as meaning with respect to the outside of the bell housing. Each convex lobe internally defines a pair of tracks for a rolling assembly. The concave parts each connect two convex lobes.

The groove that houses the retaining enlargement runs discontinuously around the radially outer surface of the bell housing. This groove is machined in each of the convex lobes by turning.

The rear end region of the boot has an internal cross section of an overall shape that complements that of the cross section of the radially outer surface of the bell housing. The retaining enlargement, which extends radially into the boot, has a peripheral extent that corresponds to that of the retaining groove in the bell housing.

The sealing means generally comprise at least two continuous peripheral lips which extend radially toward the inside of the boot, and one of which is located axially forward of the enlargement and the other of which is located to the rear of the enlargement.

If the accommodating groove in the bell housing is machined by copy turning, that is to say with the cutting tool moved, and therefore material removed, both axially and radially, one flank, generally the rear flank, of the housing groove will be relatively steeply inclined with respect to the radial direction. The corresponding sealing lip, generally the rear lip, will therefore have to be spaced axially a relatively long distance away from the enlargement so that it does not bear on a discontinuous surface and is thus able to fulfil its sealing function.

This constraint therefore entails a relative large axial extent of the rear end region of the boot slipped onto the front end region of the bell housing.

If the housing groove in the bell housing is produced by plunge turning, that is to say with radial cutting tool movement and radial removal of material, the inclination of the flanks of the groove with respect to the radial direction is more limited and the axial extent of the rear region of the boot slipped onto the bell housing can therefore be shorter.

SUMMARY OF THE INVENTION

The object of the invention is to provide a boot of the aforementioned type which can be used in transmission joints in which the housing groove in the bell housing is made at low cost by copy turning or plunge turning while at the same time ensuring a good seal, and in which the rear end region that collaborates with the bell housing of the joint has a limited axial extent.

To this end, the subject of the invention is an elastic boot of the aforementioned type, characterized in that the sealing means are located axially on one and the same side with respect to at least part of the enlargement that retains the rear end region of the boot.

According to some particular embodiments, the boot may include one or more of the following features taken in isolation or in any technical feasible combination:

- the sealing means are located axially on the same side of the entirety of the enlargement that retains the rear end region of the boot,
- the sealing means are located forward of said part of or of the entirety of the enlargement that retains the rear end region of the boot,
- the sealing means comprise at least one lip which extends from said rear end region of the boot radially in the same direction as the retaining enlargement,
- said or each sealing lip extends approximately around the entire periphery of the rear end region of the boot,
- said or each sealing lip extends roughly continuously around the entire periphery of the rear end region of the boot,
- the retaining enlargement extends discontinuously around the periphery of the rear end region of the boot,
- the rear end region of the boot has a groove for housing a member for clamping the rear end region of the boot onto the second rotary member,
- the groove that houses the clamping member is located axially, with respect to at least part of the enlargement that retains the rear end region of the boot, on the same side as the sealing means,
- the retaining enlargement extends radially inward from the rear end region of the boot.

A further subject of the invention is a transmission joint comprising a first and a second rotary member and a boot connected by a front end region to the first rotary member and by a rear end region to the second rotary member, characterized in that the boot is a boot as defined hereinabove, in that the second rotary member has, around at least part of its periphery, a groove in which the enlargement that retains the rear end region of the boot is housed, and in that the boot sealing means bear on the second rotary member axially on the same side with respect to at least part of the groove that houses the retaining enlargement.

According to particular embodiments, the transmission joint may include one or more of the following features taken in isolation or in any technically feasible combination:

- the boot sealing means bear on the second rotary member axially on the same side with respect to the entirety of the groove that houses the retaining enlargement, the boot sealing means bear on the second rotary member forward of said part of or of the entirety of the groove that houses the retaining enlargement, it comprises a member for clamping the rear end region of the boot onto the second rotary member, and the clamping member is arranged axially, with respect to at least part of the enlargement that retains the rear end region of the boot, on the same side as the sealing means, the groove that houses the retaining enlargement is formed in a radially outer surface of the second rotary member, and the retaining enlargement extends radially inward from the rear end region of the boot.

BRIEF DESCRIPTION OF THE DRAWINGS

The invention will be better understood upon reading the description which will follow, which is given merely by way of example and is made with reference to the appended drawings, in which.

DETAILED DESCRIPTION OF THE INVENTION

Figure 1:
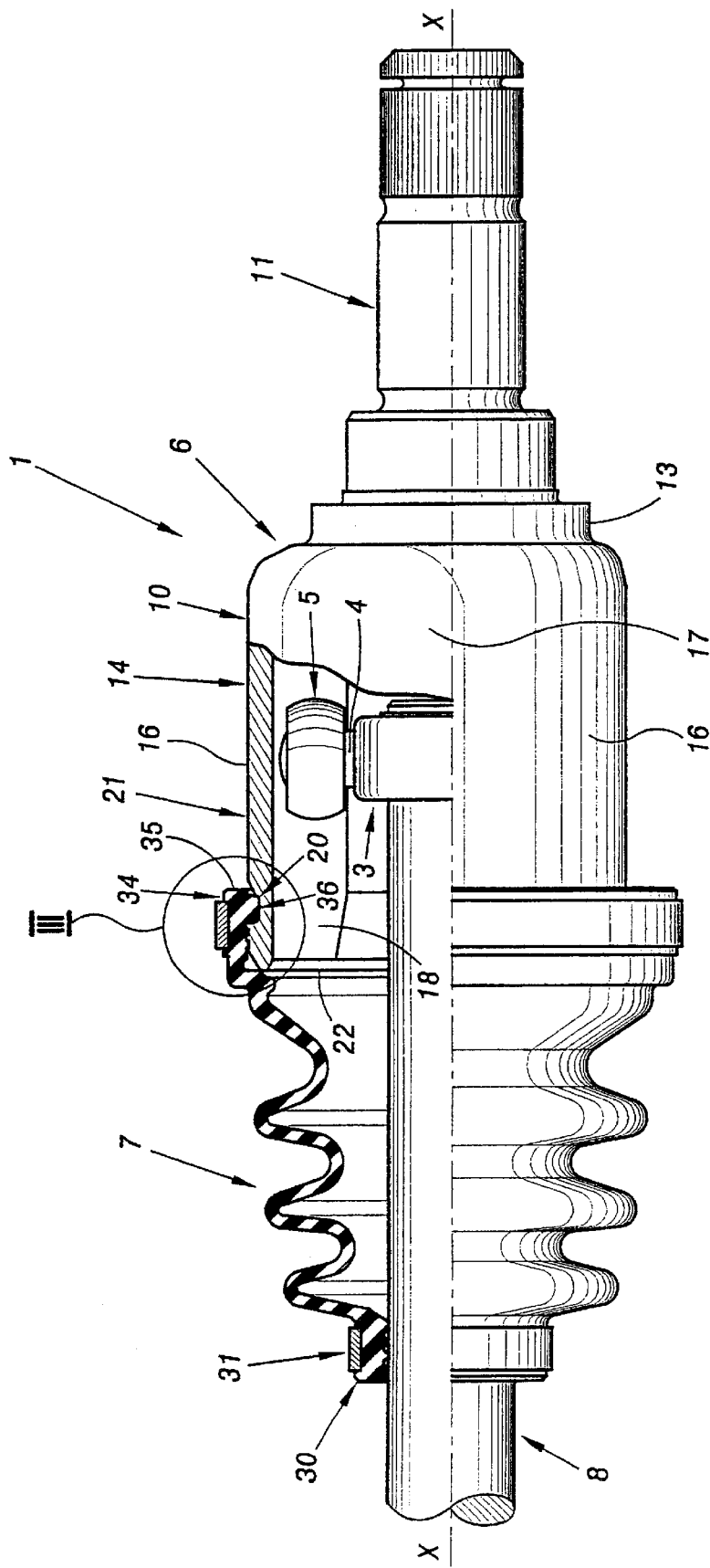
FIG. 1 is a longitudinal diagrammatic view, partially in section, of a transmission joint according to the invention.

FIG. 1 illustrates a tripot constant-velocity joint 1.

This joint 1, which has ternary symmetry about an axis X-X in its aligned position depicted in FIG. 1, essentially comprises:

a male element or tripod 3 comprising three arms 4 distributed angularly at 120° from each other and each bearing a rolling assembly 5;

a female element or bell housing 6; and an elastic boot 7 made of polychloroprene.

The tripod 3 is borne by a rotary shaft 8.

The bell housing 6 comprises a body 10 extended toward the rear (to the right in FIGS. 1 and 2) by a shank 11 intended to be connected, for example, to an output side gear of a differential.

Figure 2:
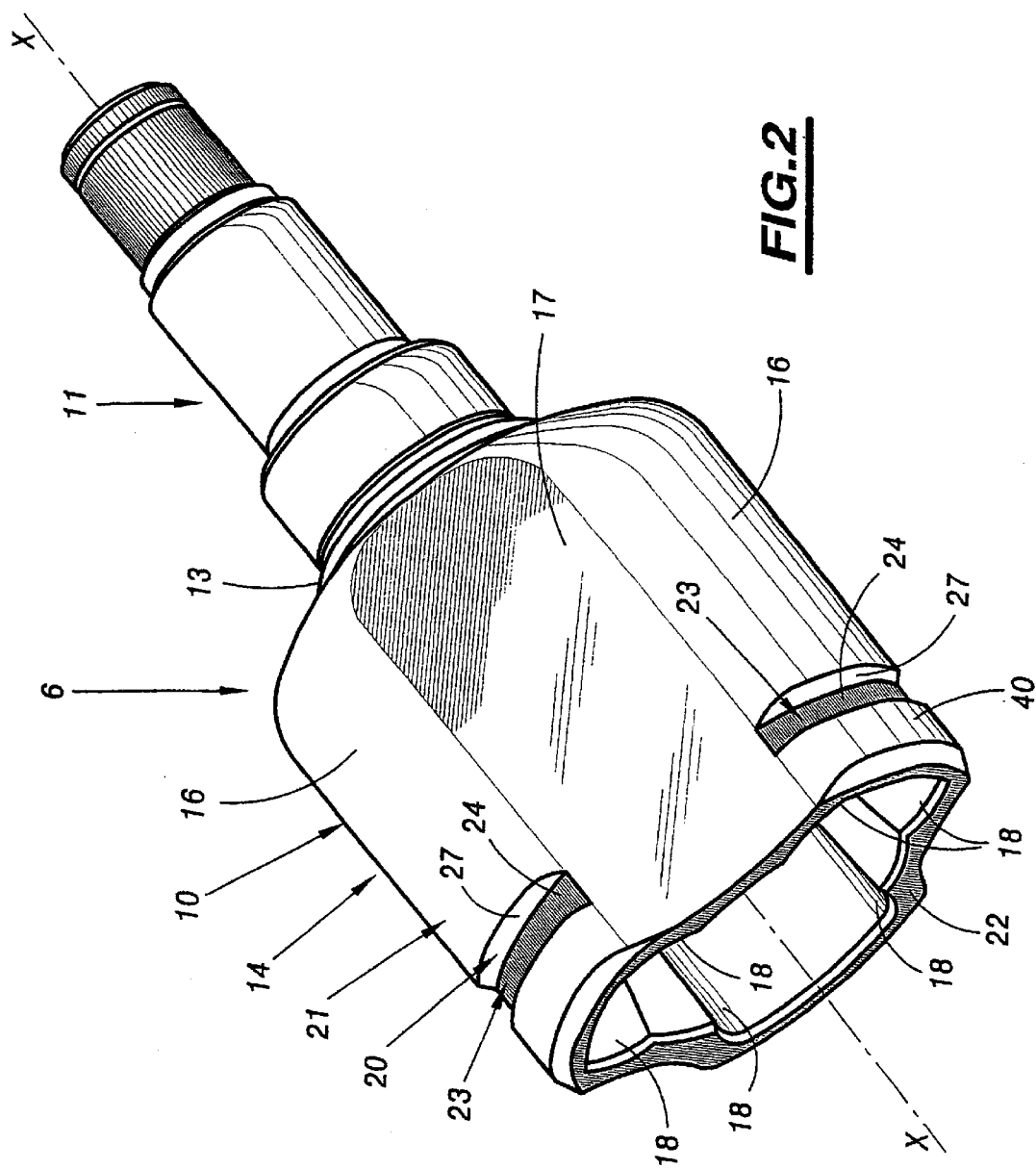
FIG. 2 is a perspective view of the bell housing of the joint of FIG. 1.

As illustrated in FIGS. 1 and 2, the body 10 comprises a bottom end 13 which bears the shank 11 and which is extended forward by a sidewall 14. The wall 14 has a cylindrical outline with respect to the longitudinal axis X-X of the bell housing 6, the directrix curve of which exhibits points of inflection. Thus, the wall 14 comprises, in alternation, and distributed at regular angles about the axis X-X, concave parts 16 and convex parts 17.

The terms "convex" and "concave" are to be understood as meaning with respect to the outside of the bell housing 6.

Each convex part or lobe 16, on the one hand, is farther from the longitudinal axis X-X of the bell housing 6 than the concave parts 17 and, on the other hand, internally defines a pair of tracks 18 along which a rolling assembly 5 is intended to roll.

Figure 4:
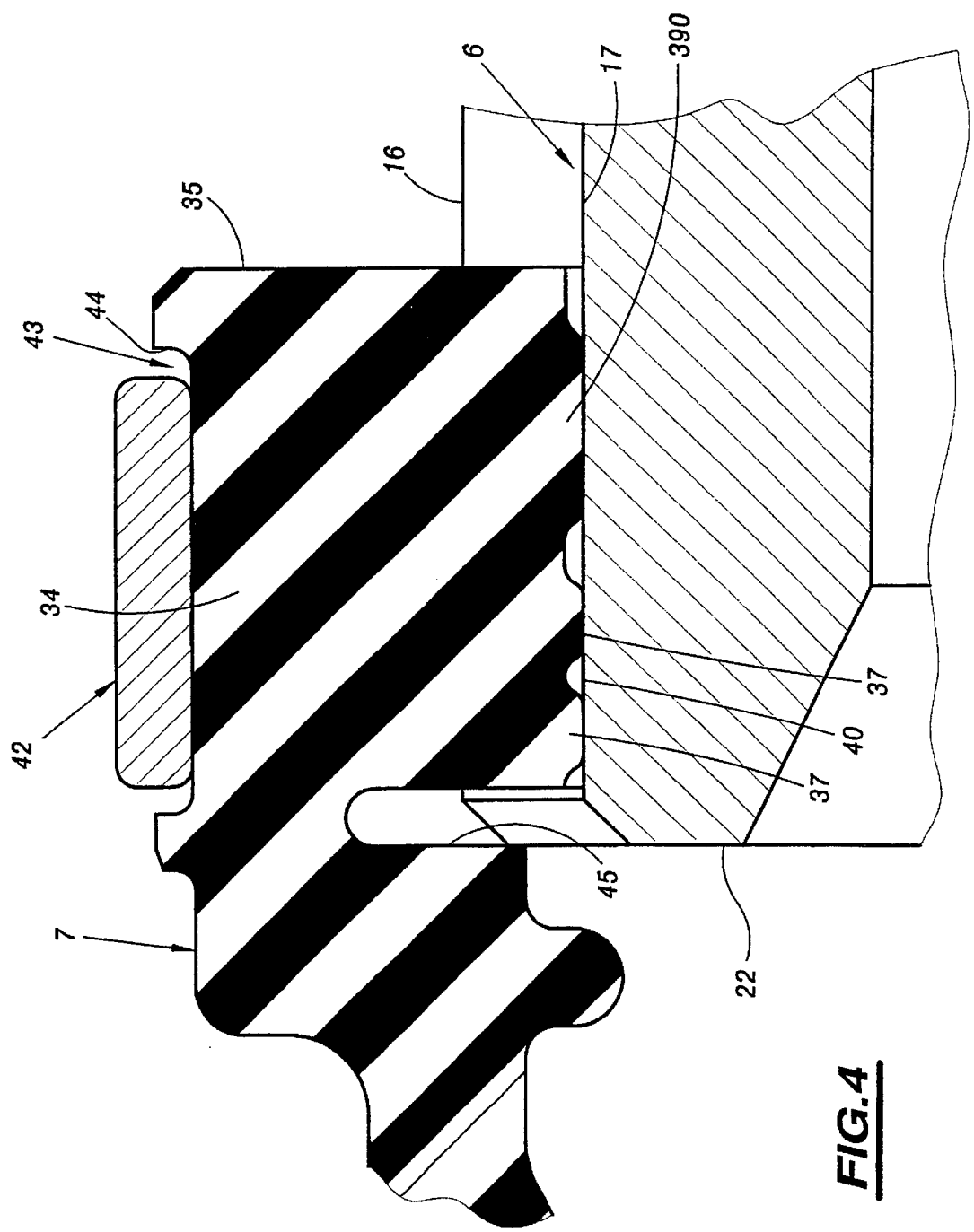
FIG. 4 is a view similar to FIG. 3 illustrating the connection between the boot and the bell housing at a concave part of the latter.

A discontinuous peripheral groove 20 of axis X-X is formed in the radially outer surface 21 of the sidewall 14 of the bell housing 6 near its front edge face or end 22. This groove 20 has a portion 23 in each lobe 16. The groove 20 is non-existent in each concave part 17 of the bell housing 6, as illustrated by FIG. 4. The bottom 24 of this groove 20 belongs to a cylinder of circular cross section and axis X-X.

The bell housing 6 has been produced by forging followed by machining, particularly of the shank 11 and of the groove 20. More specifically, the groove has been machined by copy turning with the cutting tool moved axially toward the front of the bell housing 6.

Figure 3:
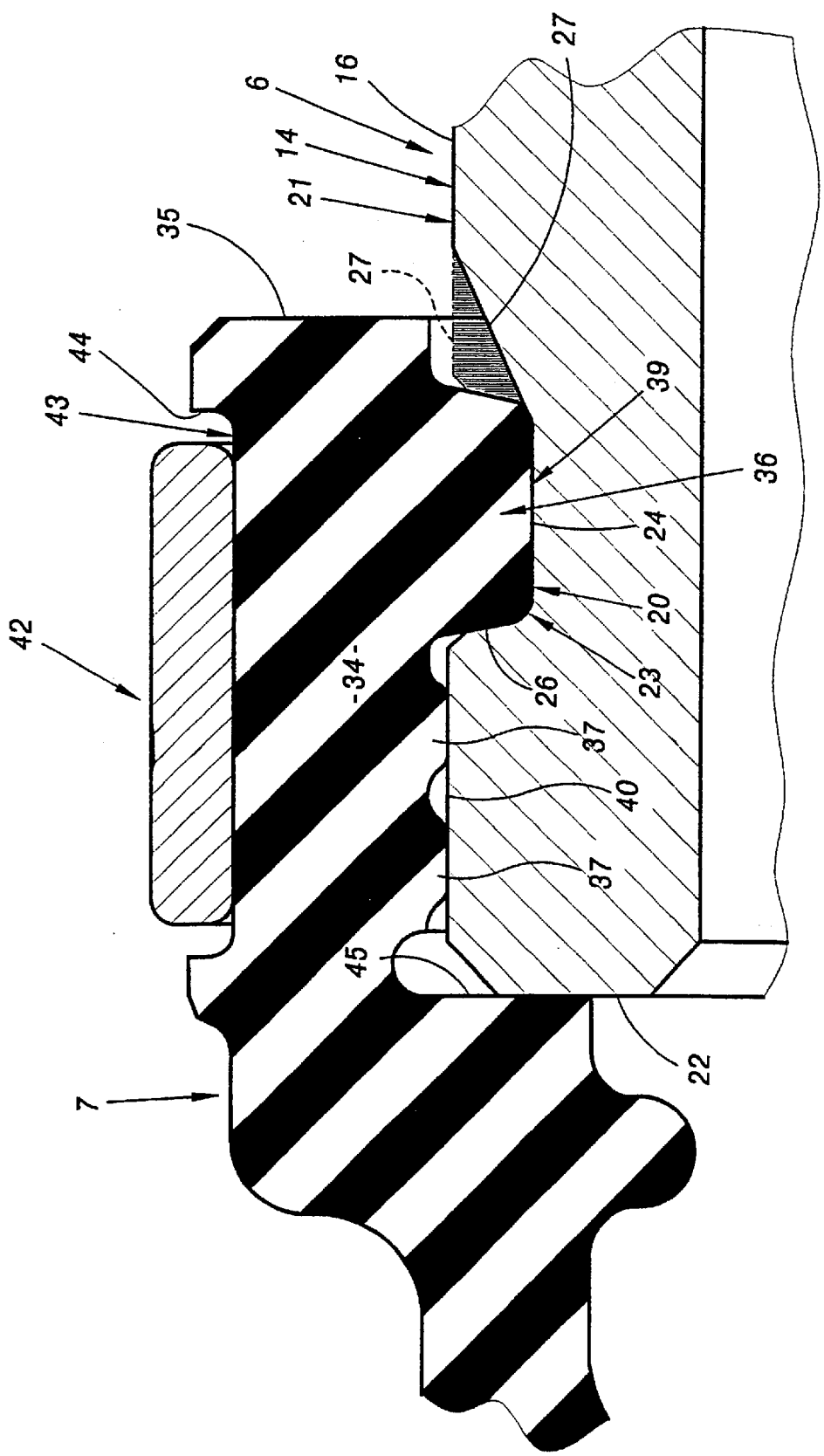
FIG. 3 is an enlarged diagrammatic sectioned view of detail III of FIG. 1, illustrating the connection between the boot and the bell housing at a convex part of the latter.

Thus, as illustrated in FIG. 3, the front flank 26 of the groove 20 has an inclination with respect to the radial direction which is limited, typically being between 0 and 15°, and the rear flank 27 (in heavy line) of the groove 20 has a relatively steep inclination with respect to the radial direction, typically being between 63 and 67°.

As can be seen in FIG. 1, a front end region 30 of the boot 7 is fixed to the first shaft 8, some distance from the tripod 3, via a clamping collar 31.

A rear end region 34 of the boot has an internal cross section of an overall shape that matches that of the radially outer surface 21 of the sidewall 14 of the bell housing 6.

As illustrated by FIG. 3, this rear end region 34 has, in succession, from the rear edge face or end 35 of the boot 7, an enlargement 36 that retains the rear end region 34 of the boot 7 and two sealing lips 37.

The retaining enlargement 36 and the sealing lips 37 are formed integrally with the rest of the elastic boot 7 and extend radially toward the inside thereof.

The enlargement 36 has an overall shape that matches that of the groove 20 in the bell housing 6. Thus, this enlargement 36 extends peripherally and discontinuously and has three identical portions 39. The rear and front flanks of the enlargement 36 are inclined symmetrically with respect to the radial direction. The front flank of the enlargement 36 is inclined with respect to the radial direction in a similar way to the front flank 26 of the groove 20.

Three bearing bulges 390 (FIG. 4) connect the portions 39 of the enlargement 36 together. These bulges 390 have a radial thickness that is less than that of the portions 39 of the enlargement 36.

The sealing lips 37 extend peripherally and continuously on the inside of the boot 7 and are spaced apart axially. The rear sealing lip 37 is spaced axially from the retaining enlargement 36 and the two lips 37 are located forward of this enlargement 36.

The rear end region 34 of the boot 7 is slipped onto the bell housing 6 at the front thereof.

The enlargement 36 is engaged in the groove 20 of the bell housing 6 and the sealing lips 37 bear on the entire periphery of the region 40 of the radially outer surface 21 of the bell housing 6 located forward of the groove 20. It will be noted that the radially outer surface 21 has a peripheral outline with no sharp edges except in the region of the groove 20 that houses the enlargement 36. The region 40 therefore has no sharp edges.

A clamping collar 42 is housed in a groove 43 which has symmetry of revolution about the axis X-X and is formed on the radially outer surface of the rear end region 34 of the boot 7. This radially outer surface of the end region 34 itself has symmetry of revolution about the axis X-X.

The groove 43 extends axially opposite the enlargement 36 and the lips 37. More specifically, this groove 43 extends forward of a rear part of the enlargement 36 and beyond the front sealing lip 37. Thus, the rear flank 44 of this groove 43 is arranged axially opposite an intermediate region of the enlargement 36 of the boot 7.

The collar 42 is housed with a small amount of axial clearance in the groove 43 and extends axially over a front part of the enlargement 36 and over the sealing lip 37. The collar 42 clamps the rear end region 34 of the boot 7 onto the bell housing 6, compressing the sealing lips 37 onto the region 40 of the surface 21 of the bell housing 6, holding the enlargement 36 of the boot 7 in the groove 20 of the bell housing 6, and pressing the bulges 390 onto the concave parts 17 of the bell housing 6.

In practice, the lips 37 are completely crushed against the surface 21, but this has not been depicted in FIG. 3 for reasons of clarity.

Finally, the boot 7 has an axial shoulder 45 arranged axially forward of the front sealing lip 37 and opposite the front end 22 of the bell housing 6.

Sealing between the rear end region 34 of the boot 7 and the bell housing 6 is provided satisfactorily by the lips 37 which are compressed, by the clamping collar 42, around the entire periphery of the sharp-edge-free region 40 of the surface 21 of the bell housing 6.

Furthermore, the rear end region 34 of the boot 7 is held axially in place with respect to the bell housing 6 in both axial directions by the enlargement 36 and also, when the rear end region 34 tends to move backward with respect to the bell housing 6, by virtue of the shoulder 45 of the boot 7 which then bears on the front end 22 of the bell housing 6.

It will be noted that the axial extent of the clamping collar 42 is limited. In an alternative form which has not been depicted this clamping collar 42 does not extend axially opposite the enlargement 36 or does so only to a small extent. However, the position and axial length of the clamping collar 42 have to be contrived so that it opposes the tilting of the enlargement 36 when the rear end region 34 of the boot 7 tends to move forward with respect to the bell housing 6.

The rear end region 34 of the boot 7 slipped onto the bell housing 6 has a limited axial length. This result is achieved by virtue of the fact that the sealing lips 37 are located axially on the same side with respect to at least part of the enlargement 36 and by virtue of the fact that the groove 20 has been produced by copy turning with an axial movement of the cutting tool toward this side.

The boot 7 can just as easily be used with a transmission joint 1 in which the groove 20 of the bell housing 6 has been produced by plunge turning as illustrated by FIG. 3 where the rear flank 27 of such a groove 20 has been depicted in chain line.

According to an alternative form which has not been depicted, the sealing lips 37 are located to the rear of the enlargement 36 of the boot 7. In this alternative form, the groove 20 that houses the enlargement 36 may be produced by plunge turning or by copy turning with the cutting tool moved axially toward the rear of the bell housing 6.

What is claimed is:

1. A boot (7) comprising a front end region (30) for connecting to a first rotary member (8) and a rear end region (34) for connecting to a second rotary member (6), the rear end region (34) of the boot including, around at least part of its periphery, a directrix curve of which has a transverse outline exhibiting points of inflection, a radially projecting enlargement (36) for housing in a groove (20) of the second rotary member so as to hold the rear end region (34) of the boot axially in place with respect to the second rotary member (6) and, the rear end region of the boot including sealing means consisting of sealing members (37) for bearing on the second rotary member, wherein all of the sealing members are located axially on one and the same side with respect to at least part of the enlargement (36) that retains the rear end region (34) of the boot.

2. The boot as claimed in claim 1, wherein all of the sealing members are located axially on the same side of the entirety of the enlargement that retains the rear end region of the boot.

3. The boot as claimed in claim 1, wherein all of the sealing members are located forward of part of the enlargement that retains the rear end region of the boot.

4. The boot as claimed in claim 1, wherein all of the sealing members comprise at least one lip which extends from said rear end region of the boot radially in the same direction as the retaining enlargement so as to bear radially on the second rotary member.

5. The boot as claimed in claim 4, wherein said at least one lip extends approximately around the entire periphery of the rear end region of the boot.

6. The boot as claimed in claim 4, wherein said at least one lip extends approximately continuously around the entire periphery of the rear end region of the boot.

7. The boot as claimed in claim 1, wherein the retaining enlargement extends discontinuously around the periphery of the rear end region of the boot.

8. The boot as claimed in claim 1, wherein the rear end region of the boot has a groove (43) for housing a member (42) for clamping the rear end region of the boot onto the second rotary member.

9. The boot as claimed in claim 8, wherein the groove (43) that houses the clamping member (42) is located axially, with respect to at least part of the enlargement (36) that retains the rear end region of the boot, on the same side as the sealing members.

10. The boot as claimed in claim 1, wherein the retaining enlargement extends radially inward from the rear end region of the boot.

11. A transmission joint comprising:
a first rotary member (8);
a second (6) rotary member; and
a boot (7) comprising a front end region (30) connected to the first rotary member and a rear end region (34) connected to the second rotary member, wherein the rear end region (34) of the boot includes, around at least part of its periphery, a directrix curve of which has a transverse outline exhibiting points of inflection, a radially projecting enlargement (36) for housing in a groove (20) of the second rotary member so as to hold the rear end region (34) of the boot axially in place with respect to the second rotary member (6) and, wherein the rear end region of the boot includes sealing means consisting of sealing members (37) for bearing on the second rotary member, wherein all of the sealing members are located axially on one and the same side with respect to at least part of the enlargement (36) that retains the rear end region (34) of the boot, and wherein the second rotary member (6) has, around at least part of its periphery, a transverse outline of which has a directrix curve matching that of the rear end region of the boot, a groove (20) in which the enlargement (36) that retains the rear end region (34) of the boot is housed, and wherein the boot sealing members (37) bear on the second rotary member (6) axially on the same side with respect to at least part of the groove (20) that houses the retaining enlargement (36).

12. The joint as claimed in claim 11, wherein the boot sealing members (37) bear on the second rotary member axially on the same side with respect to the entirety of the groove (20) that houses the retaining enlargement (36).

13. The joint as claimed in claim 11, wherein the boot sealing members (37) bear on the second rotary member (6)

forward of part of the groove (20) that houses the retaining enlargement (36).

14. The joint as claimed in claim 11, comprising a clamping member (42) for clamping the rear end region (34) of the boot onto the second rotary member (6), wherein the clamping member (42) is arranged axially, with respect to at least part of the enlargement (36) that retains the end region.

15. The joint as claimed in claim 11, wherein the sealing members comprise at least one lip which extends from said rear end region of the boot radially in the same direction as the retaining enlargement and bear radially on the second rotary member.

* * * * *